Nov. 12, 1940.    H. D. GEYER    2,221,400
FRICTION CLUTCH FACING
Filed Feb. 1, 1940
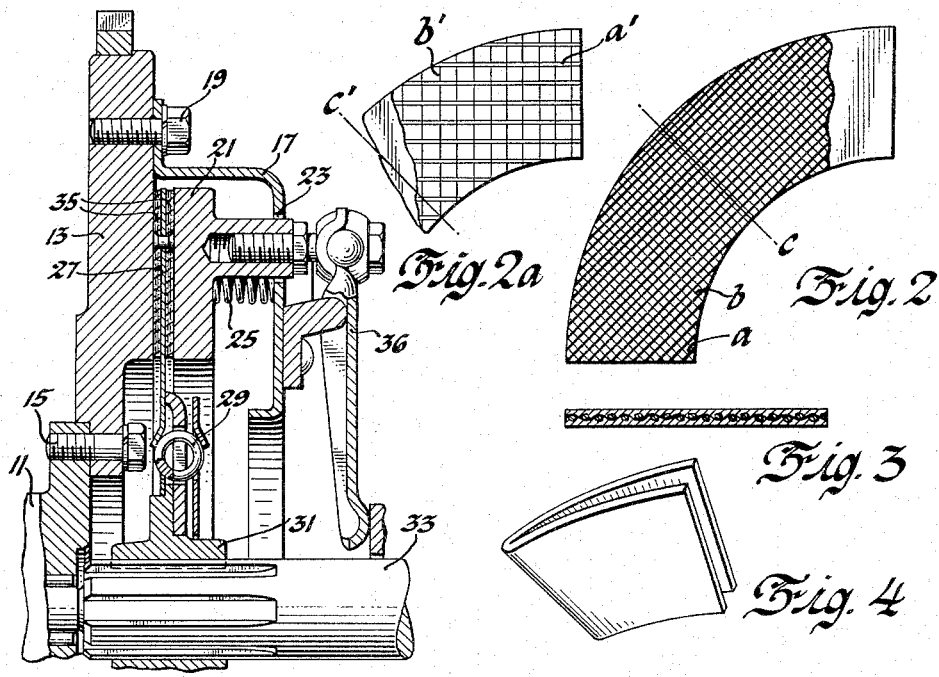
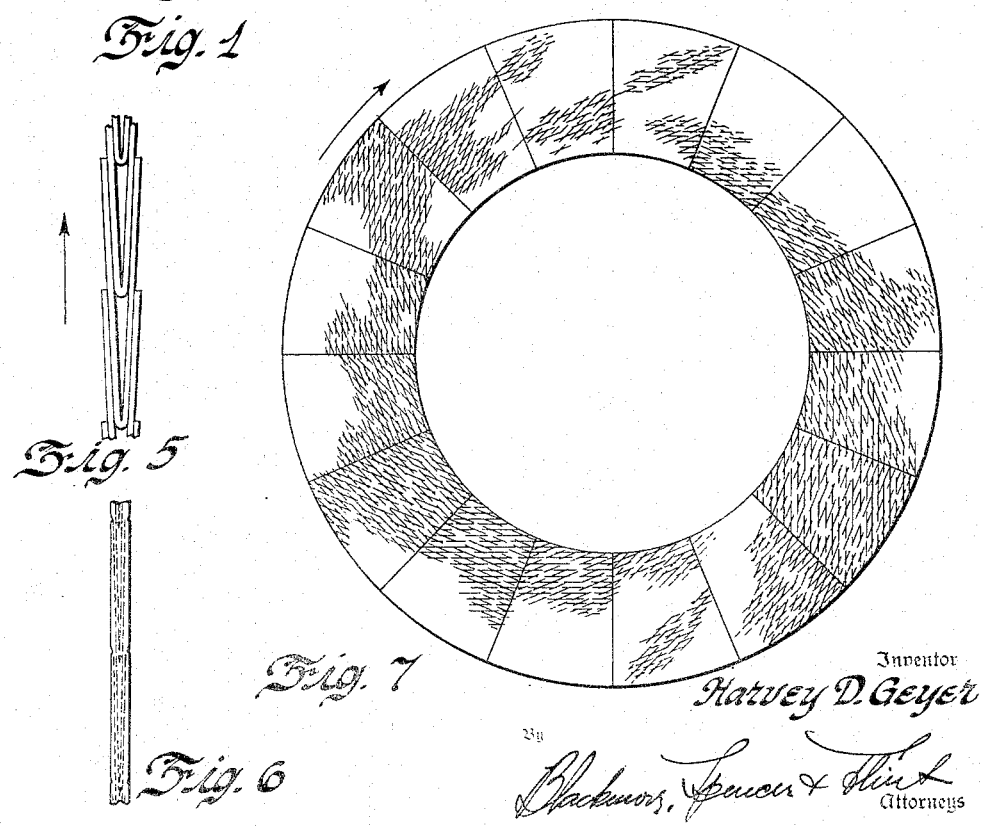
Inventor
Harvey D. Geyer
Blackmore, Spencer & Flint
Attorneys Patented Nov. 12, 1940

2,221,400

UNITED STATES PATENT OFFICE 2,221,400

FRICTION CLUTCH FACING

Harvey D. Geyer, Dayton, Ohio, assignor to General Motors Corporation, Detroit, Mich., a corporation of Delaware Application February 1, 1940, Serial No. 316,811

7 Claims. (Cl. 192—107)

This invention relates to friction material and to a process for its manufacture. It relates more particularly to an improvement in a friction facing for motor vehicle clutches.

An object of the invention is to provide a facing which will be durable, strong, tough and efficient and one wherein the tendency to chatter is minimized. An endless ring clutch facing made in accordance with this invention should have all the advantages of a facing reinforced with laminated asbestos-metallic cloth and yet be capable of being manufactured at a low cost from scrap or waste material.

Other objects and advantages will be understood from the description which follows.

On the drawing:

Figure 1 shows a clutch in transverse section.

Figure 2 is a plan view, partly broken away, of one of the segments of friction material from which the clutch facing is made.

Figure 2a is a similar view of a modified form.

Figure 3 is a sectional view of the friction material.

Figure 4 and Figures 5 and 6 are views showing successive steps in the process.

Figure 7 is a plan view of the completed facing.

No novelty is claimed for the clutch assembly and Figure 1 is intended merely to illustrate one use for the novel facing. In Figure 1 the engine crankshaft marked 11 is secured to the flywheel 13 by bolts 15. A cover 17 is secured to the flywheel at 19. Within the enclosure formed by the flywheel and cover is a substantially conventional pressure plate 21 guided by the cover at 23. Suitable springs such as 25 serve to move the pressure plate toward the flywheel and grip the driven plate 27. The driven plate has a resilient torque transmitting connection marked 29 with a hub 31 carried by the transmission shaft 33. The driven plate 27 has annular friction facings 35 on each side to contact with the flywheel face and with the pressure plate. Numeral 36 represents a conventional releasing means.

The invention is concerned with the facing 35 and its method of manufacture. An asbestos-metallic cloth such as is commonly used is employed for making the facings. Such a cloth is made up of the usual warp and filler threads. The warp threads are preferably of asbestos reinforced with metal. They may be spaced somewhat apart or may be closely adjacent each other. The filler threads may be of the same material or may be light threads without metallic reinforcement. If desired, they may be of cotton or other suitable material of sufficient strength to hold the warp in place during the process of making the facing.

This cloth, in sheets or strips of suitable size, is frictioned with a suitable compound. Any preferred ratio of cloth or compound may be used, equal parts by weight of each, for example. A suggested compound may include 30 parts by weight of rubber, 10 parts of sulphur, 30 parts of litharge, 20 parts of barytes and 20 parts of carbon black. Variations from these proportions may be found desirable in order to obtain different friction characteristics. The process of frictioning the cloth may be carried out by means of a calender. It is also possible to coat the material by dipping and treating the cloth in the compound, in which case the compound should be modified by the addition of a suitable solvent, such as gasolene or naphtha to obtain a suitable consistency. As another method, the compound may be reduced to a paste and spread on the fabric in such a manner as to fill all the interstices and to produce a smooth coating. Figure 2 is intended to illustrate the cloth after treatment.

Segments are then stamped or clicked from the friction material as shown by Figure 2. The segment shown subtends an arc of 90° although the arc may be greater or less than 90°. Each segment has an outside radius slightly greater than one-half the diameter of the finished facing and an inside radius slightly smaller than one-half the diameter of the finished annulus. It will be seen from Figure 2 that the segments are cut in such a way that the warp threads $a$ extend as chords while the filler threads $b$ extend at right angles thereto. The segment is then folded about a mid-length radial line $c$ to form V-shaped pieces as shown in Figure 4. A plurality of folded segments are then assembled together by inserting one V-shaped piece into another as shown in Figure 5 to form a complete ring. Each folded segment may extend into the adjacent piece for one-half or two-thirds of its length. When nested in adjacent pieces for one-half of their length, sixteen pieces will be required to complete the circle. If nested to two-thirds the length of the adjacent piece, twenty-four segments will be necessary. The depth of nesting may be varied to obtain a desired thickness of the finished ring or to suit the thickness of the frictioning of the segments.

After the pieces are assembled into ring form the completed ring is flattened by rolling or by some other suitable method to firmly anchor the pieces in position so that the assembly will stand the necessary handling during the subsequent steps without causing any relative displacement of the pieces.

The preformed facings are then placed in molds under pressure and heat and for such a length of time as is necessary to fuse and cure them and to make of them a hard, strong and durable ring. The faces are then ground to produce an equal thickness throughout. The inner and outer edges are ground to get the desired diameters. Thereafter they are drilled and counterbored for attachment to the driven plate.

Instead of stamping the segments with the threads extending as shown by Figure 2, the threads of the segments may extend as shown by Figure 2a where a' and b' represent the warp and filler threads respectively.

When assembled on the driven plate the facings are positioned in such a manner that the rotating flywheel and pressure plate move from the apex of each V toward the open end as shown by Figure 5 when the arrow indicates the direction of movement of the flywheel. In consequence of this position the flywheel and pressure plate have a pulling effect upon the facings and not a push. This obviously will avoid any tendency to disrupt the friction ring in use.

I claim:

1. A friction facing comprising a plurality of V-shaped pieces nested together circumferentially to form a ring.

2. For use in a clutch having a driven disc adapted to be gripped between two driving members each having one and the same direction of rotation, facings between said driven disc and each of said members, said facings comprising nested V-shaped pieces distributed in a circular series, the V-shaped pieces opening in such a direction that the rotation of the driving members creates a pull, not a push.

3. The process of making a clutch facing comprising forming segments, folding said segments along mid length radii to form V-shaped pieces and nesting said pieces to form an annulus.

4. The process of making a clutch facing comprising frictioning a fabric material, cutting said material to form segments having its warped fibers extending as chords, folding said segments along mid length radii to form V-shaped pieces, nesting said pieces to form an annulus, subjecting said annulus to heat and pressure to form a friction ring.

5. The process of making friction facings comprising treating a fabric having at least its warp threads of metal reinforced fibers with a friction creating compound, cutting said materials into segments, folding said segments along mid length radii to form V-shaped pieces, nesting said pieces to form an annulus, rolling said annulus to flatten the same to prevent the relative movement of the pieces, and subjecting said annulus to heat and pressure to fuse and cure the same.

6. The process of making friction facings comprising treating a fabric having at least its warp threads of metal reinforced fibers with a friction creating compound, cutting said materials into segments, folding said segments along mid length radii to form V-shaped pieces, nesting said pieces to form an annulus, rolling said annulus to flatten the same to prevent the relative movement of the pieces, grinding said annulus to obtain flat parallel faces and to produce the required inner and outer diameters, and subjecting said annulus to heat and pressure to fuse and cure the same.

7. The process of making friction facings comprising treating a fabric having at least its warp threads of metal reinforced fibers with a friction creating compound, cutting said materials into segments having its warp threads extending as chords, folding said segments along mid length radii to form V-shaped pieces, nesting said pieces to form an annulus, rolling said annulus to flatten the same to prevent the relative movement of the pieces, grinding said annulus to obtain flat parallel faces and to produce the required inner and outer diameters, and subjecting said annulus to heat and pressure to fuse and cure the same.

HARVEY D. GEYER.